United States Patent Office 3,822,277
Patented July 2, 1974

3,822,277
CERTAIN PYRIDYL CYCLOPROPYLAMIDES
Claude Dufour, 27 Rue Delabordere,
92 Neuilly-sur-Seine, France
No Drawing. Continuation of abandoned application Ser. No. 807,395, Mar. 14, 1969. This application Mar. 28, 1972, Ser. No. 238,963
Claims priority, application Monaco, Nov. 13, 1967, 727; France, Feb. 5, 1968, 138,762; Apr. 3, 1968, 146,807; Apr. 12, 1968, 148,138; Nov. 25, 1968, 175,185; Dec. 4, 1968, 176,511
Int. Cl. C07d 31/44
U.S. Cl. 260—295 AM                11 Claims

ABSTRACT OF THE DISCLOSURE

Compounds having the formula:

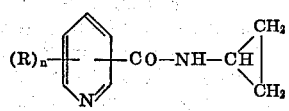

wherein R is a member selected from the group consisting of hydrogen, halogen, hydroxyl acyl groups of 1 to 4 carbon atoms, carboxylic acid groups, carboxylic acid ester groups, amido groups, sulfonic acid groups, sulfonamido groups and hydrocarbon groups of 1 to 8 carbon atoms and $n$ is 0, 1 or 2. The unsubstituted derivatives are useful in the treatment of arterial hypertension, and the substituted derivatives are particularly useful as diuretics, hypotensive agents, sedatives and as anorectic agents.

---

This is a continuation of application Ser. No. 807,395, filed Mar. 14, 1969, now abandoned.

This invention relates to various novel compounds having an amide function and their use in therapy. More particularly, it relates to the preparation and use of cyclopropylamides derived from pyridine carboxylic acids. Additionally, the invention relates to the preparation and use of derivatives of these compounds that are substituted in the aromatic ring with various moieties, such as halogen, acyl, carboxyl, ester, amido, sulfonic, sulfonamido or hydrocarbon groups.

The cyclopropylamides of the invention are represented by the formula:

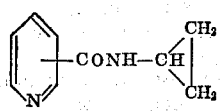

These compounds, which have the form of white crystalline powders, are soluble in water and exceedingly stable. They are derived from the reaction between a pyridine carboxylic acid (or acyl halide or alkyl ester thereof) and a cyclopropylamine. These compounds are prepared either (a) by the direct elimination of a water molecule between the pyridine carboxylic acid and the cyclopropylamine, if desired in a solvent and in the presence of a suitable catalyst, or (b) by the action of a pyridine carboxylic acid halide on the cyclopropylamine, if desired in the presence of an alkaline agent which binds the hydracid formed during the course of the reaction. Alternative to the latter reaction, the cyclopropylamine may be reacted with a low molecular weight alcohol ester of the pyridine carboxylic acid if desired in a suitable solvent.

A specific example of a useful compound belonging to the above-described group is the cyclopropylamide of 2-pyridine carboxylic acid, i.e., picolinic cyclopropylamide. This compound is a liquid and is capable of producing well crystallized salts with organic or mineral acids.

These compounds, as well as the salts thereof with organic or mineral acids, are soluble in water and yield aqueous solutions having a pH close to neutral (around 7). They are stable and can be formulated in all of the customary pharmaceutical forms, if desired in association with other active principles, and in the presence of any compatible excipients.

Among the compounds of the present invention, nicotinic cyclopropylamide and isonicotinic cyclopropylamide have a particularly low toxicity. As a matter of fact, the $LD_{50}$ of these compounds is of the order of 1.250 mg./kg. as measured intraperitoneally in mice. In contrast thereto, picolinic cyclopropylamide has a toxicity which is almost three times higher, measured under the same conditions.

The compounds described hereinabove, particularly the picolinic, nicotinic and isonicotinic cyclopropylamides as well as the salts thereof with mineral or organic acids, show a particularly interesting activity with respect to the functioning of the nervous system. They exert a long-lasting hypotensive action, free from secondary effects, and thus are particularly useful for the treatment of arterial hypertension.

The record of the arterial tension or pressure of a dog treated with varying quantities of isonicotinic cyclopropylamide, for example, shows a tension drop which passes from 12 cm. to 6 cm. of mercury for doses close to 50 mg./kg., the latter value being maintained for more than 100 minutes. During this experiment, no secondary action whatsoever was observed on either the respiration or on the intestinal motility. However, it is to be recognized that there is a strong reduction of the diuresis while the animal is put in hypotension.

Accordingly, compounds of the character described hereinabove permit a particularly effective treatment of hypertension without secondary effects or intolerances. Two examples of pharmaceutical preparations containing these compounds are given below for purposes of illustration. However, the details thereof should not be considered as limitative of the invention.

EXAMPLE 1

Preparation of sugar-coated tablets. Tablets are prepared containing 100 mg. of isonicotinic cyclopropylamide and sufficient excipient (QS) to give finished sugar-coated tablets of 250 mg. each. The posology to be employed therewith is 1 to 8 tablets per day for adults (100 mg. to 800 mg. per day of active principle).

EXAMPLE 2

Preparation of suppositories. Suppositories are prepared containing 200 mg. of nicotinic cyclopropylamide and sufficient excipient (QS) to give finished suppositories of 3 grams each. The posology to be employed therewith is 1 to 4 suppositories per day (200 mg. to 800 mg. per day of active principle).

In another embodiment of the invention, it has been found that compounds having the formula

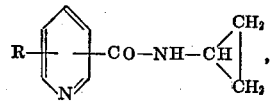

wherein R is (1) at least one substituent selected from the group consisting of hydrogen and halogen radicals ("halogen" referring to chlorine, bromine, iodine or fluorine atoms), (2) at least one hydroxyl group (which can be acylated with a carboxylic acid having 1 to 4 carbon atoms), (3) at least one carboxylic acid group (which can be esterified or amidated), (4) at least one sulfonic acid group (which can be amidated) or (5) at least one hydrocarbon group having from 1 to 8 carbon atoms, which can be either branched or straight-chain alkyl or cyclic, have particularly interesting properties which permit their use in various applications. The latter substituent (hydrocarbon groups) may contain one or several multiple (double or triple) bonds. The described "R" substituent as well as the carboxylic cyclopropylamide group may occupy any of the positions on the pyridine ring. Also useful are the salts of these compounds with mineral or organic acids, as well as the addition derivatives thereof through the nitrogen of the pyridine nucleus, such as the halo-alcoholates, the sulfo-alcoholates and the amine oxides.

Compounds containing substitution groups in the pyridine nucleus are prepared as described above with respect to the unsubstituted compounds, i.e., from substituted pyridine carboxylic acids having the formula:

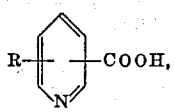

wherein R has the same meaning as described hereinabove. Reaction takes place either by the direct elimination of a water molecule between the substituted pyridine carboxylic acid and the cyclopropylamine (operating, if desired, in an inert solvent and in the presence of a suitable catalyst) or by the action of a substituted carboxylic pyridine acid halide or a low molecular weight alkanol ester of the substituted pyridine carboxylic acid on the cyclopropylamine (if desired, in an inert solvent and, in the case of the acid halide, in the presence of an alkaline agent which fixes or binds the hydracid formed during the course of the reaction). These compounds may also be obtained in good yield either by the direct introduction of the R substituent into the pyridine ring of a cyclopropylamide having the formula

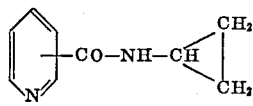

or by the substitution of the R group for an R' group which has previously been introduced into the nucleus. For example, if it is desired to obtain compounds having chlorine atoms in the pyridine nucleus, it is easy to obtain them by reacting the corresponding hydroxylated derivatives with an appropriate chlorination agent.

The nuclear-substituted compounds are white crystalline powders and are completely stable. They are generally sufficiently soluble in water but may be transformed into very soluble salts by acidification of the nitrogen atom of the pyridine nucleus with an appropriate acid. These compounds have the property of being extremely active molecules with respect to the functioning of the nervous system. They generally have a low toxicity and can be used in various pharmaceutical and veterinary applications.

In another embodiment of the present invention, the present inventor has found that compounds having the following formula:

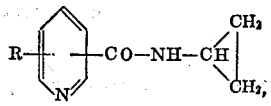

wherein R has the same meaning as described hereinabove, have particularly interesting properties which make them extremely useful in therapy, particularly for the treatment of disorders of the nervous system. As with the nuclear-substituted derivatives described hereinabove, the "R" substituent as well as the carboxylic cyclopropylamide group may occupy any of the positions on the pyridine ring.

These latter derivatives are generally crystalline substances which are perfectly stable and soluble in water. In the case that the solubility thereof should be insufficient, they may be easily converted into salts with mineral or organic acids, the latter likewise falling within the framework of the present invention. Other useful derivatives thereof include the addition derivatives through the nitrogen atom of the pyridine nucleus, such as the halo-alcoholates, the sulfo-alcoholates and the amine oxides.

These derivatives are also obtained in accordance with the reactions described above from substituted carboxylic pyridine acids having the formula

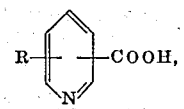

wherein R has the same meaning as described hereinabove. The reaction is carried out either by the direct elimination of a water molecule between the carboxylic pyridine acid and cyclopropylamine (if desired, in the presence of a solvent and a suitable catalyst) or by reaction between the cyclopropylamine and a carboxylic pyridine acid halide (if desired, in the presence of an alkaline agent designed to fix the hydracid formed during the course of the reaction) or the cyclopropylamine and an alcohol ester, of low molecular weight, of the carboxylic pyridine acid (if desired, in a suitable solvent). These derivatives may also be obtained in good yield either by the direct introduction of the R substituent into the pyridine ring of a cyclopropylamide or by the substitution of the R substituent for an R' group which has previously been introduced into the nucleus. Thus, as with the derivatives described above, if it is desired to obtain compounds having chlorine substituents in the nucleus, these can be readily obtained by reacting the corresponding hydroxylated derivatives with an appropriate chlorination agent.

Exemplary of compounds falling within the described categories are the following:

picolinic cyclopropyl amide
nicotinic cyclopropyl amide
isonicotinic cyclopropyl amide
5-chloro-cyclopropyl nicotinamide
5,6-dichloro-cyclopropyl nicotinamide
2-chloro-cyclopropyl nicotinamide
2,6-dihydroxycyclopropyl isonicotinamide
2,6-dichloro-cyclopropyl isonicotinamide
2,6-dichloro-cyclopropyl nicotinamide
2-bromo-cyclopropyl nicotinamide
2,4-dibromo-cyclopropyl nicotinamide
6-bromo-cyclopropyl nicotinamide
2-bromo-6-chloro-cyclopropyl nicotinamide
2-fluoro-cyclopropyl nicotinamide
2,6-difluoro-cyclopropyl nicotinamide
2-methyl-cyclopropyl nicotinamide
2-ethyl-cyclopropyl nicotinamide
2-phenyl-cyclopropyl nicotinamide
2-phenyl-6-chloro-cyclopropyl nicotinamide
2-phenyl-6-bromo-cyclopropyl nicotinamide
2-phenyl-5-chloro-cyclopropyl nicotinamide
2-phenyl-5-bromo-cyclopropyl nicotinamide
2-(2-chlorophenyl)-cyclopropyl nicotinamide
2-(4-chlorophenyl)-cyclopropyl nicotinamide
2-(4-methoxyphenyl)-cyclopropyl nicotinamide
4-phenyl-cyclopropyl nicotinamide
2-anilino-cyclopropyl nicotinamide as well as the isomers in the 4, 5 and 6-positions
the chloro-cyclopropyl isonicotinamides
the bromo-cyclopropyl isonicotinamides
the chloro-cyclopropyl-picolyl amides
the bromo-cyclopropyl picolylamides
4-hydroxy-cyclopropyl nicotinamide
4,5-dihydroxy-cyclopropyl nicotinamide and the hydroxy-substituted derivatives thereof with methyl, ethyl, propyl, isopropyl, and butyl groups 2-amino-cyclopropyl nicotinamide
2-amino-cyclopropyl isonicotinamide
4-sulfamido-cyclopropyl nicotinamide The compounds according to the invention, which have perfect stability, may be formulated in any of the customary pharmaceutical forms, such as inert tablets, sugar-coated tablets, solutions which are drinkable, injectable preparations, granulated products and syrups, if desired, in combination with other active principles and in the presence of any compatible excipients.

All of the compounds of the invention have the advantage of a generally low toxicity, even with repeated administrations, and display in varying degrees diuretic, hypotensive and sedative properties which make it possible to use these products in a plurality of applications, all the more so since their action is generally not accompanied by disturbing secondary effects. The nuclear-substituted derivatives of the invention effect a potentialization of sleep, such as that caused by hypnotic agents. Measured in mice, this is apparent from a reduction of the time required for the onset of sleep and from an increase in the duration of the sleep, varying from 25 to 75% thereof, depending upon the cases. The substituted derivatives of the invention show a diuretic action which is manifested particularly in the molecules containing one or several halogen atoms and most especially with compounds containing chlorine in the nucleus.

The measurements concerning the increase of the diuresis, which were carried out on male rats, have made it possible to find an increase proportional to the dosage and which varies from 50 to 400% as a function thereof. It is particularly interesting to note that this increase of the diuresis does not entail an important variation of the elimination rates of sodium and potassium. As noted above, the substituted derivatives of the invention have equally more or less marked hypotensive properties which are not accompanied by secondary effects, particularly on the cardiac and respiratory systems.

Finally, it has also been found that the last-described derivatives are moderators for the consumption of foodstuffs, i.e., appetitecurbing agents. The anorectic effect becomes evident at doses varying from 5 to 50 mg./kg. in rats and may involve a reduction of food consumption or intake of from 20 to 30%. This effect is particularly clear during repeated administrations for several days in a row.

All of these properties taken together make it possible to prepare, with the aid of the compounds of the present invention, medicines which are particularly effective and well tolerated, especially from the cardiac point of view, for treating disorders of the general metabolism, conditions of obesity and hypertension. Moreover, the very low toxicity of the compounds according to the present invention constitutes a considerable advance as compared to the related compounds known to date, particularly those having an amphetaminic structure.

The following examples illustrate pharmaceutical preparations in accordance with the invention and are not to be considered as limiting in character.

EXAMPLE 3

Tablets are prepared from 250 mg. of nicotinic cyclopropylamide and sufficient excipient (QS) for finished tablets of 350 mg. each.

EXAMPLE 4

Sugar-coated tablets are prepared by using 100 mg. of 2, 6-dichlorocyclopropyl nicotinamide and sufficient excipient (QS) to give finished sugar-coated tablets of 250 mg. each.

EXAMPLE 5

Suppositories are prepared from 200 mg. of 2,6-dihydroxy-cyclopropyl 4 - carboxy - pyridine and sufficient excipient (QS) for finished suppositories of 25 grams each.

The posology to be employed with the nuclear-substituted derivatives varies from 100 to 500 mg. per day, or more if desired. The very low toxicity thereof makes it possible to repeatedly administer them without any intolerance or habit-forming phenomena.

Accordingly, one of the objects of the present invention is to provide novel compounds having an amide function.

Another object of the present invention is to provide a process for the preparation of the described compounds which may be carried out in an efficacious and relatively simple manner.

A further object of the invention is to provide pharmaceutical preparations containing the described novel compounds.

A still further object of the invention is to provide organic compounds which are useful in therapy.

These and other objects and advantages of the present invention should become apparent to those skilled in the art from a consideration of the above description as well as the following examples.

The following examples concerning the preparation of the compounds of the present invention are given merely as illustrative and are not to be considered as limiting. It is to be understood that the conditions of reaction may be varied from the specific details given.

EXAMPLE 6

Preparation of cyclopropyl nicotinamide. Nicotinic acid hydrochloride (1 mole) is prepared by reacting excess thionyl chloride with nicotinic acid. After concentration of the excess of thionyl chloride, the residue is recovered by means of benzene and, while cooling is effected in such a manner that the temperature will not exceed $+5°$, cyclopropylamine diluted with benzene is added while stirring until a distinctly alkaline reaction is achieved (about 2.5 moles). Stirring is continued for 2 hours at ambient temperature and the crystallized cyclopropylamine hydrochloride is then centrifuged. Thereafter, the solution is concentrated in vacuo and the residue recovered with an equal quantity of benzene. A white crystallized product is separated which is centrifuged and recrystallized in a volume of benzene.

The cyclopropyl nicotinamide is thus obtained in a yield of 70 to 75% in the form of a white crystalline powder which is soluble in water and alcohol, insoluble in ether and which melts at 84–85° C. (microscope). This product, when subjected to elementary analysis, gives the following results:

C, 66.7, 66.6; H, 6.31, 6.31; N, 17.16, 17.19. Calculated for $C_9H_{10}N_2O=162.19$. C, 66.6; H, 6.17; N, 17.28.

The nearly perfect coincidence between the figures obtained and the theoretical figures confirms the exactness of the formula proposed for the new compound.

EXAMPLE 7

Preparation of cyclopropyl isonicotinamide. 50 grams of methyl isonicotinamide, 23 grams of cyclopropylamine and 80 cc. of glycol are placed into a round-bottomed flask and the mixture is allowed to stand at 50° C. At the end of several hours, a crystallized product begins to separate. When the reaction is terminated, which may take several days, the reaction mixture is cooled, frozen, centrifuged, washed in acetone and then dried at 50° C., thereby yielding 25 grams of a crystallized product. By concentration of the mother liquors and recovery in acetone, a second batch of 17 grams is obtained. The two batches are combined and dissolved in 3 volumes of hot acetone. After filtration, crystallization and drying, 35 to 37 grams of a white crystallized product is obtained, the product having a melting point of 115–116° C. (microscope) and being soluble in water and alcohol.

When subjected to the elementary analysis, this product gives the following figures:

C, 66.42, 66.59; H, 6.55, 6.34; N, 17.4, 17.26.

Calculated for $C_9H_{10}N_2O = 162.19$. C, 66.65; H, 6.17; N, 17.28.

The coincidence of the figures found with the theoretical values establishes with certainty the structure of the new compound.

EXAMPLE 8

Preparation of picolinic cyclopropylamide. 25.5 grams of the ethyl ester of alpha-picolinic acid is dissolved in 50 ml. of glycol in a reaction apparatus equipped with a stirring device or mechanism. Added thereto is 12 grams of cyclopropylamine. The mixture is stirred at 50° C. for 15 hours. Thereafter, the mixture is concentrated in vacuo and then the residue is distilled under a high vacuum. The principal fraction passing at 95–96° C. under 0.4 mm. of mercury is collected. It is a colorless liquid which after, redistillation, has a refraction index $n_D^{18°}$ of 1.5605. The chromatography thereof in the gaseous phase reveals only a single peak and the elementary analyses are in substantially perfect agreement with the theoretical values calculated for $C_9H_{20}N_2O$.

The product thus obtained may also be easily titrated in perchloric acid. It is soluble in cold water at the rate of about 14% and is equally soluble in alcohol, ether and acetone. It yields salts with the mineral or organic acids. For example, the hydrochloride thereof is a white crystalline powder which is very soluble in water and which crystallizes easily in methyl ethyl ketone. It melts at 132°–134° C. (microscope) and, in the aqueous solution, has a pH of between 1.5 and 2.

EXAMPLE 9

Preparation of 5 - chloro-cyclopropyl nicotinamide. 65 grams of 5-chloro-methyl nicotinate (melting point 88–90° C.) is dissolved in 80 ml. of ethylene glycol and 24 grams of cyclopropylamine is added thereto. The mixture is allowed to stand at 50° C. for several hours. When the reaction is terminated, the glycol is concentrated in vacuo and the residue is recovered with acetone, yielding crystalline 5-chloro-cyclopropyl nicotinamide. The residue may be centrifuged, washed and dried and the product may be recrystallized in isopropyl alcohol, if desired.

Obtained in this manner is 40 to 45 grams of 5-chlorocyclopropyl nicotinamide which, when subjected to elementary analysis, gives the following figures:

C, 55.1, 55.2; R, 4.60, 4.63; N, 14.1, 14.15; Cl, 17.7. Calculated for $C_9H_9N_2OCl = 196.70$. C, 54.90; R, 4.57; N, 14.23; Cl, 18.0.

The agreement between the theoretical values and the figures found establishes the structure of the new compound with certainty.

EXAMPLE 10

Preparation of 5,6-dichloro-cyclopropyl nicotinamide:

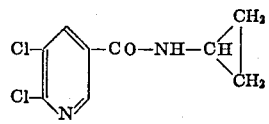

The reaction is conducted in a manner analogous to that described in Example 9, except that 5,6-dichloromethyl nicotinate (m.p. 68° C.) is employed as a reactant. As a result, 5,6-dichlorocyclopropyl nicotinamide is obtained in the form of white needles which are not very soluble in water in a yield of 65%.

EXAMPLE 11

Preparation of 2-chloro-cyclopropyl nicotinamide

The hydrochloride of 2-chloro-nicotinic acid is prepared by reacting one mole thereof (melting point 193° C.) with an excess of thionyl chloride. When the reaction is complete, the excess is eliminated, the residue is recovered with benzene and, while cooling in such a manner that the temperature does not exceed +5° C. cyclopropylamine is added while stirring until a distinctly alkaline reaction is obtained (about 2.5 moles).

Stirring is continued in the cold for 2 hours and the mixture is brought to reflux for ½ hour. The mixture is cooled and the resultant crystallized cyclopropylamine hydrochloride is centrifuged. The solution is washed in a concentrated water-actone mixture. The 2-chloro-cyclopropyl nicotinamide then crystallizes. The mixture is centrifuged, washed with acetone and recrystallized in a mixture of ether and petroleum ether.

The yield reaches 85 to 90%. The product melts at 172° C. and gives analytical results in substantially perfect conformity with the theoretical values.

EXAMPLE 12

Preparation of 2,6-dihydroxy-cyclopropyl isonicotinamide

A mixture of 21.5 grams of 2,6-dihydroxy-methyl isonicotinate, 125 ml. of ethylene glycol and 30 grams of cyclopropylamine is kept in the oven at 50° C. for 150 hours. Everything passes progressively into solution. When the reaction is terminated, the mixture is concentrated in vacuo and the residue is recovered with 60 ml. of alcohol. The crystallized product is frozen and centrifuged, washed in alcohol and then in water. Obtained in this manner are 20 grams of crude product which, when recrystallized in acidic water, gives the desired product in good yield in the form of pale yellow needles which are soluble in hot water and which melt with decomposition at 234–236° C. (microscope).

The product is subjected to the elementary analysis and gives the following results:

C, 55.44, 55.21; H, 5.33; 5.30; N, 14.43, 14.49. Calculated for $C_9H_{10}O_3N_2 = 194.19$. C, 55.66; H, 5.19; N, 14.43.

EXAMPLE 13

2,6-dichloro-cyclopropyl isonicotinamide

When the product obtained according to Example 12 is treated with a halogenation agent, for example, with phosphorus oxychloride or pentachloride, in the presence of an inert solvent, 2,6-dichloro-cyclopropyl isonicotinamide is obtained without difficulty. The brominated derivative may be obtained in a corresponding way. The yield reaches 75 to 80% of the theoretical.

By operating in an analogous manner, the following products for example, have also been prepared:

2,6-dichloro-cyclopropyl nicotinamide
2-bromo-cyclopropyl nicotinamide
2,4-dibromo-cyclopropyl nicotinamide
6-bromo-cyclopropyl nicotinamide
2-bromo-6-chloro-cyclopropyl nicotinamide
2-fluoro-cyclopropyl nicotinamide
2,6-difluoro-cyclopropyl nicotinamide
2-methyl-cyclopropyl nicotinamide
2-ethyl-cyclopropyl nicotinamide
2-phenyl-cyclopropyl nicotinamide
2-phenyl-6-chloro-cyclopropyl nicotinamide
2-phenyl-6-bromo-cyclopropyl nicotinamide
2-phenyl-5-chloro-cyclopropyl nicotinamide
2-phenyl-5-bromo-cyclopropyl nicotinamide
2-(2-chlorophenyl)-cyclopropyl nicotinamide
2-(4-chlorophenyl)-cyclopropyl nicotinamide
2-(4-methoxyphenyl)-cyclopropyl nicotinamide
4-phenyl-cyclopropyl nicotinamide
2-anilino-cyclopropyl nicotinamide (as well as the 4-, 5- and 6-position isomers)
the chloro-cyclopropyl isonicotinamides
the bromo-cyclopropyl isonicotinamides
the chloro-cyclopropyl picolylamides
the bromo-cyclopropyl picolylamides
4-hydroxy-cyclopropyl nicotinamide 4,5-dihydroxy-cyclopropyl nicotinamide (and the derivatives thereof substituted through the hydroxyl groups by methyl, ethyl, propyl, isopropyl and butyl groups)
2-amino-cyclopropyl nicotinamide
2-amino-cyclopropyl isonicotinamide
4-sulfamido-cyclopropyl nicotinamide.

The invention being thus described, it will be obvious that the same may be varied in many ways. Such variations are not to be regarded as a departure from the spirit and scope of the invention, and all such modifications as would be obvious to one skilled in the art are intended to be included herein.

I claim:
1. A compound having the formula:

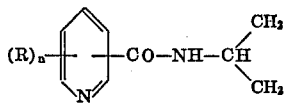

wherein R is a member selected from the group consisting of hydrogen, hydroxyl, halogen selected from the group consisting of bromo, chloro, iodo, and fluoro, acyl groups of 1 to 4 carbon atoms, and hydrocarbon groups of 1 to 8 carbon atoms which are linear or lateral branched alkyl or cyclic groups, and $n$ is 0, 1 or 2, with R being a halogen group only when $n$ is 1 or when $n$ is 2, and one of the R groups is other than halogen, or both R groups are halogen and are in the 2-, 4-positions, the 2-, 5-positions, or the 5-, 6-positions.

2. Cyclopropyl nicotinamide.
3. Cyclopropyl isonicotinamide.
4. Picolinic cyclopropylamide.
5. 5-Chloro-cyclopropyl nicotinamide.
6. 5,6-Dichloro-cyclopropyl nicotinamide.
7. 2-Chloro-cyclopropyl nicotinamide.
8. A compound according to claim 1, wherein R represents hydroxyl groups.
9. A compound according to claim 1, wherein R represents halogen groups.
10. A compound according to claim 1, wherein R represents hydrocarbon groups selected from the group consisting of methyl, ethyl, propyl, isopropyl, butyl and phenyl.
11. A compound according to claim 1, wherein R represents acyl groups of 1 to 4 carbon atoms.

References Cited
UNITED STATES PATENTS

| | | | |
|---|---|---|---|
| 3,400,132 | 9/1968 | Horrom | 260—294.9 |
| 2,752,354 | 6/1956 | Ginell et al. | 260—295 AM |

OTHER REFERENCES

Pitha, Chem. Abstracts, Vol. 59, Sept. 2, 1963, 5123-h-5124-d.

Roberts et al., Basic Principles of Organic Chemistry, Benjamin Publishers, pp. 803 and 806, 1965.

ALAN L. ROTMAN, Primary Examiner

U.S. Cl. X.R.

260—294.8 F, 295.5 A; 424—266